United States Patent
Killamsetti et al.

(10) Patent No.: US 10,705,927 B2
(45) Date of Patent: Jul. 7, 2020

(54) FREEZE A VOLUME OF A REPLICATION SET AND UNFREEZE THE VOLUME BASED ON AT LEAST ONE OF A SNAPSHOT PERMIT MESSAGE, A SNAPSHOT ABORT MESSAGE, AND EXPIRATION OF A TIMEOUT

(71) Applicant: HEWLETT PACKARD ENTERPRISE DEVELOPMENT LP, Houston, TX (US)

(72) Inventors: Praveen Killamsetti, San Jose, CA (US); Tomasz Barszczak, San Jose, CA (US); Monil Mukesh Sanghavi, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 27 days.

(21) Appl. No.: 16/040,129

(22) Filed: Jul. 19, 2018

(65) Prior Publication Data
US 2020/0026617 A1   Jan. 23, 2020

(51) Int. Cl.
*G06F 11/14* (2006.01)
*G06F 11/16* (2006.01)

(52) U.S. Cl.
CPC ...... *G06F 11/1469* (2013.01); *G06F 11/1456* (2013.01); *G06F 11/1464* (2013.01); *G06F 11/1662* (2013.01); *G06F 2201/84* (2013.01)

(58) Field of Classification Search
CPC ............ G06F 11/1469; G06F 11/1464; G06F 11/1456; G06F 11/1662; G06F 2201/84
USPC .......... 707/686, 620; 711/162, 154; 709/219
See application file for complete search history.

(56) References Cited

U.S. PATENT DOCUMENTS

| | | | |
|---|---|---|---|
| 7,844,787 B2 | 11/2010 | Ranganathan et al. | |
| 8,090,907 B2 | 1/2012 | Ainscow et al. | |
| 8,438,347 B1 | 5/2013 | Tawri et al. | |
| 8,656,073 B2 | 2/2014 | Elrom et al. | |
| 9,218,255 B2 * | 12/2015 | Brown ............... | G06F 11/1662 |
| 2009/0313311 A1 | 12/2009 | Hoffmann et al. | |

(Continued)

OTHER PUBLICATIONS

Mirzoev, T., "Synchronous Replication of Remote Storage," (Research Paper), Journal of Communication and Computer, Mar. 2009, vol. 6, No. 3, pp. 34-39. https://arxiv.org/ftp/arxiv/papers/1404/1404.2176.pdf.

*Primary Examiner* — Hong C Kim
(74) *Attorney, Agent, or Firm* — Hewlett Packard Enterprise Patent Department

(57) ABSTRACT

According to examples, a system may include an upstream volume controller having: a processor and a non-transitory machine-readable storage medium. The storage medium may include instructions executable by the processor to freeze an upstream volume, the upstream volume being in a replication set with a downstream volume, receive a snapshot creation request, create a snapshot of the upstream volume, and send one of a snapshot permit message or a snapshot abort message to a downstream volume processor. The instructions may also be executable by the processor to unfreeze the upstream volume responsive to at least one of the sending of the one of the snapshot permit message or the snapshot abort message or expiration of a timeout corresponding to a maximum time period during which the upstream volume is to remain frozen.

20 Claims, 7 Drawing Sheets

(56) References Cited

U.S. PATENT DOCUMENTS

| | | | | |
|---|---|---|---|---|
| 2016/0147855 A1* | 5/2016 | Bhagat | ................... | G06F 16/27 |
| | | | | 707/620 |
| 2016/0150012 A1* | 5/2016 | Barszczak | ............. | G06F 3/0607 |
| | | | | 709/219 |
| 2019/0317667 A1* | 10/2019 | Killamsetti | ............. | G06F 3/065 |
| 2019/0324651 A1* | 10/2019 | Bali | ........................ | G06F 3/065 |

* cited by examiner

FREEZE A VOLUME OF A REPLICATION SET AND UNFREEZE THE VOLUME BASED ON AT LEAST ONE OF A SNAPSHOT PERMIT MESSAGE, A SNAPSHOT ABORT MESSAGE, AND EXPIRATION OF A TIMEOUT

BACKGROUND

Storage systems may be used for a variety of purposes including access to shared data by multiple users and data storage. Storage systems may include storage devices that are collocated with each other and/or located at multiple locations. Data stored at storage devices may be replicated and the replicated copies of the data may be stored on multiple storage devices to safeguard against the failure of a single storage device. As such, when a storage device fails or the data in the storage device is inadvertently erased or edited, a copy of the desired data may be retrieved from another storage device.

BRIEF DESCRIPTION OF THE DRAWINGS

Features of the present disclosure may illustrated by way of example and not limited in the following figure(s), in which like numerals indicate like elements, in which.

DETAILED DESCRIPTION

Figure 1:
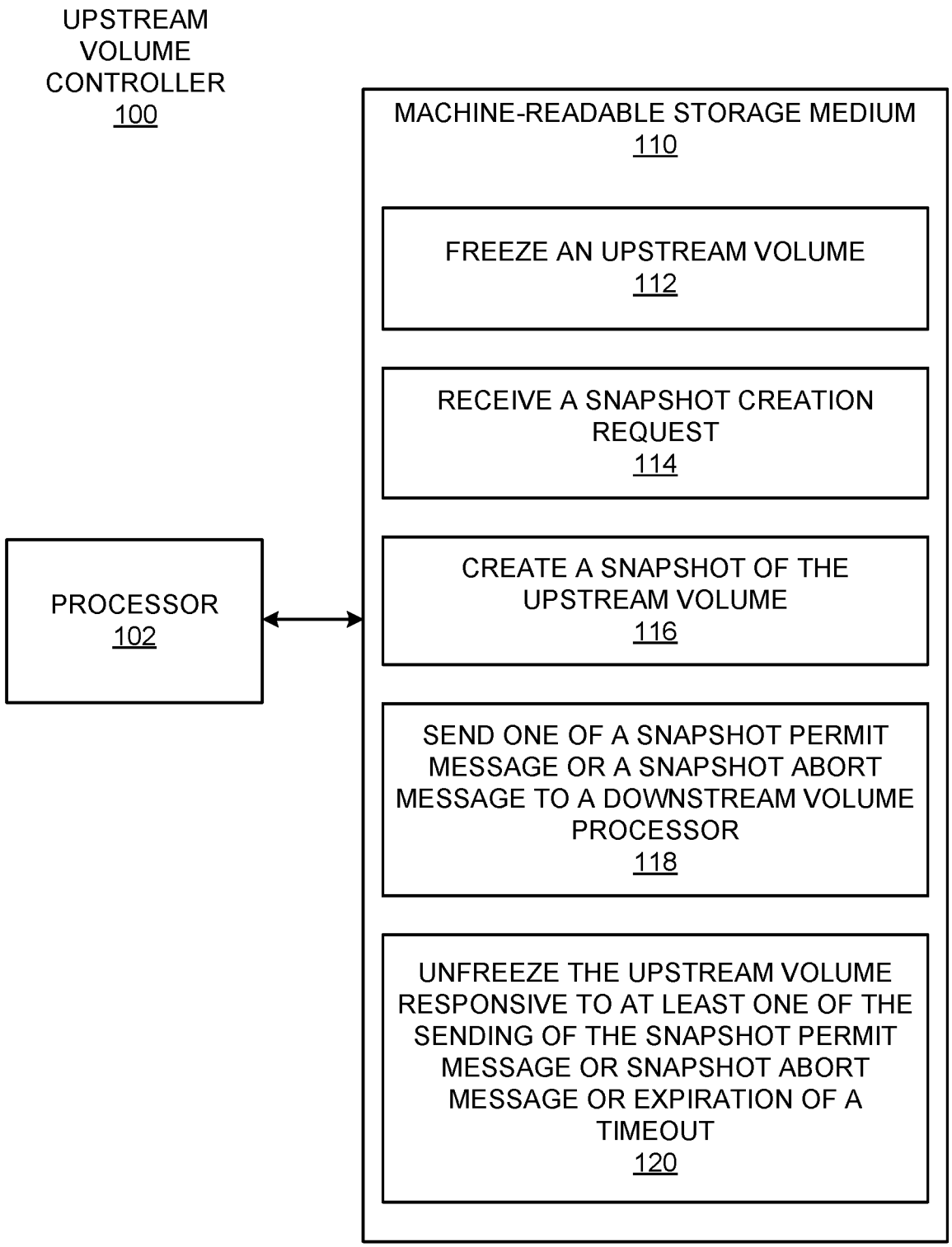
FIG. 1 depicts a block diagram of an example upstream volume controller that may manage an upstream volume.

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

An individual input/output (IO) may be replicated from an upstream volume to a downstream volume after the IO is committed locally (e.g., a snapshot of the IO stored in the upstream volume may be replicated in the downstream volume) to ensure that data is highly available should the upstream volume fail or become unavailable for a variety of other reasons, such as planned power outages, network upgrades, software upgrades, etc. The IO replication process may fail in various instances, such as, when a network outage occurs, when there is a downstream array issue (e.g., a controller failover, or some other temporary outage), when the downstream array is out of resources and is thus unable to process the IO replication request fast enough, a user administration operation may interrupt the replication, or the like. In the case of error in the IO replication process, the IO replication process may be repeated until a host issues an abort or a certain timeout is reached. In the event of an IO replication failure, the downstream volume may be marked as being out-of-sync before responding to the host. In addition, a snapshot abort message may be sent to a downstream volume controller. In response to receipt of the snapshot abort message, the downstream volume controller may not create the snapshot. In this regard, the downstream volume controller may skip creation of that snapshot.

During the IO replication process, the upstream volume and the downstream volume may be frozen. That is, during the replication process, an upstream volume controller may not commit any IOs on data in the upstream volume and a downstream volume controller may not commit any IOs on data in the downstream volume. As a result, the replication process may disrupt the latency of the IO commits on the upstream volume and the downstream volume.

Disclosed herein are apparatuses and methods for managing the creation of snapshots of an upstream volume and a downstream volume, in which the upstream volume and the downstream volume are in a replication set with each other, e.g., a relationship in which changes in the upstream volume may periodically be replicated to the downstream volume. Particularly, for instance, the snapshots may be created while reducing or minimizing the amount of time that the upstream volume is frozen, which may result in a reduced or a least amount of IO interruption caused by the snapshot creation operations. As discussed herein, an upstream volume processor that may manage the upstream volume may send snapshot creation instructions to a downstream volume processor that may manage the downstream volume. In this regard, the downstream volume processor may wait to receive a snapshot permit message from the upstream volume processor prior to creating a snapshot of the downstream volume.

The upstream volume processor may send the snapshot permit message in response to a determination that the downstream volume is in-sync with the upstream volume. According to examples, the upstream volume processor may wait to send the snapshot permit message until the upstream volume processor determines that the downstream volume is in-sync with the upstream volume. In other examples, the upstream volume processor may send a snapshot abort message to the downstream volume processor based on a determination that the downstream volume is out-of-sync with the upstream volume.

As discussed herein, the upstream volume processor may unfreeze the upstream volume responsive to the sending of the snapshot permit message or the snapshot abort message to the downstream volume processor. That is, the upstream volume processor may unfreeze the upstream volume immediately, e.g., within about 1 ms and about 2 seconds, following the sending of the snapshot permit message or the snapshot abort message to the downstream volume processor. In other words, the upstream volume processor may unfreeze the upstream volume prior to expiration of an expiration time following the freezing of the upstream volume, in which the expiration time may normally signal a maximum time at which the upstream volume is unfrozen. By unfreezing the upstream volume in this manner, the upstream volume may be kept in the frozen state for a minimum length of time, which may minimize IO disruption. However, the upstream volume may be unfrozen when a timeout corresponding to the maximum time period during which the upstream volume may remain frozen expires if the upstream volume becomes unfrozen prior to expiration of the timeout.

In examples described herein, each time a snapshot for an upstream volume is initiated, a snapshot identifier may be assigned to the snapshot, for instance, by a management entity, e.g., a group management daemon. The management entity may be executed on a host, the upstream volume, the downstream volume, an outside volume, or the like, and may initiate the snapshot on the upstream volume and the downstream volume. The management entity may also send the assigned snapshot ID to both the upstream volume controller and the downstream volume controller. According to examples, the management entity may assign a last snapshot identifier (ID) for a current snapshot of the upstream volume to be created, and may tag input/outputs (IOs) with the last snapshot ID for the upstream volume. The upstream volume processor may also send the tagged IOs to the downstream volume processor. The downstream volume processor may accept the tagged IOs as long as the last snapshot ID for the upstream volume is greater than a downstream volume last snapshot ID (e.g., a snapshot ID of a last snapshot created of the downstream volume). In addition, the downstream volume processor may use the last snapshot ID for the upstream volume in the tagged IO to determine if the IO was received prior to or after the last snapshot creation of the downstream volume. Thus, in an instance in which the last snapshot ID for the upstream volume in the tagged IO is greater than the downstream volume last snapshot ID, the downstream volume processor may save the IO in a queue and may accept the IO following creation of the snapshot of the downstream volume or following unfreezing of the downstream volume due to expiration of the expiration time. However, in an instance in which the last snapshot ID for the upstream volume is less than or equal to the last downstream volume snapshot ID, the downstream volume processor may reject the IO.

A technical problem associated with creating snapshots of upstream volumes and downstream volumes in replication sets is that the upstream volumes and the downstream volumes may be frozen during the snapshot creation operations. The longer that the volumes remain frozen, the longer that the volumes are unable to accept IOs, which may reduce the latencies of the volumes. A technical solution as provided in the present disclosure is that by unfreezing the upstream volume immediately following the sending of the snapshot permit message or the snapshot abort message, the length of time that the upstream volume remains frozen may be reduced, which may decrease latency of the upstream volume. In addition, by including the last snapshot IDs for the upstream volumes with IOs communicated from the upstream volume processor to the downstream volume processor, the downstream volume processor may more selectively freeze the downstream volume, e.g., may accept certain IOs (IOs having last snapshot IDs for the upstream volumes that are higher than the downstream volume last snapshot IDs) following receipt of a freeze instruction from a host. As a result, the downstream volume may maintain consistent data with the upstream volume.

As used herein "snapshot" may refer to a temporal dependent view of a volume of data. In other words, a data source and applications operating on data being housed in the data source may have a given state of the data as it exists at a particular instant in time captured as a snapshot. A "data source" may refer to a volume or collection of volumes that house the data for applications. An "application" may refer to a set of software instructions, a service, or a system that may interact with data housed at the data source.

As used herein, an input/output (I/O) may refer to an operation that may alter (e.g., create, delete, or modify) data housed in a data source or volume. Examples of I/O operations may include writes and deletes.

As used herein, a "freeze" instruction may indicate that a processor may not commit any IOs on data contained in a volume until the processor receives an "unfreeze" instruction. An "unfreeze" or "thaw" instruction may indicate that IOs on data contained in a volume may begin. As described herein, the volumes may from time to time be suspended or frozen from committing IOs on data in the volumes until other processing completes or is acknowledged thus, an unfreeze or thaw command may permit the volumes to resume from a current frozen state of operation.

As used herein, a "volume" may refer to a manageable entity that contains data for a given application or a logical unit number (LUN). As used herein a "snapshot" may refer to a time-dependent view of a collection of data. In other words, a snapshot may be used to maintain a state of a collection of data as it existed at a particular point in time at which the snapshot was captured. An "application" may refer to a set of software instructions, a service, or a system that interacts with data housed at the data source. A replicated volume (e.g., a second volume) may be a remote volume that is external to a local volume and that is being kept in synchronization with the local volume via some mechanism, such as synchronous block-based data replication.

As used herein, a "source volume" or "upstream volume" may be a volume that is a source of data replication for a replication set (e.g., a volume from which data is replicated to another volume), while a "destination volume" or "downstream volume" may be a volume of the replication set that receives data replicated from a source or upstream volume of the replication set. In some examples, host writes directed to a volume of a replication set may be committed to a source or upstream volume before the writes are replicated to a downstream volume.

In examples described herein, a particular storage array may include both upstream volume(s) (e.g., for some replication set(s)) and downstream volume(s) (e.g., for other replication set(s)). For example, a single storage array may include a first volume that is a source volume of one replication set and a second volume that is a destination volume for another replication set. In such examples, the storage array may be considered as a "source" storage array for the first replication set and simultaneously may be considered as a "destination" storage array for the second replication set.

Figure 2:
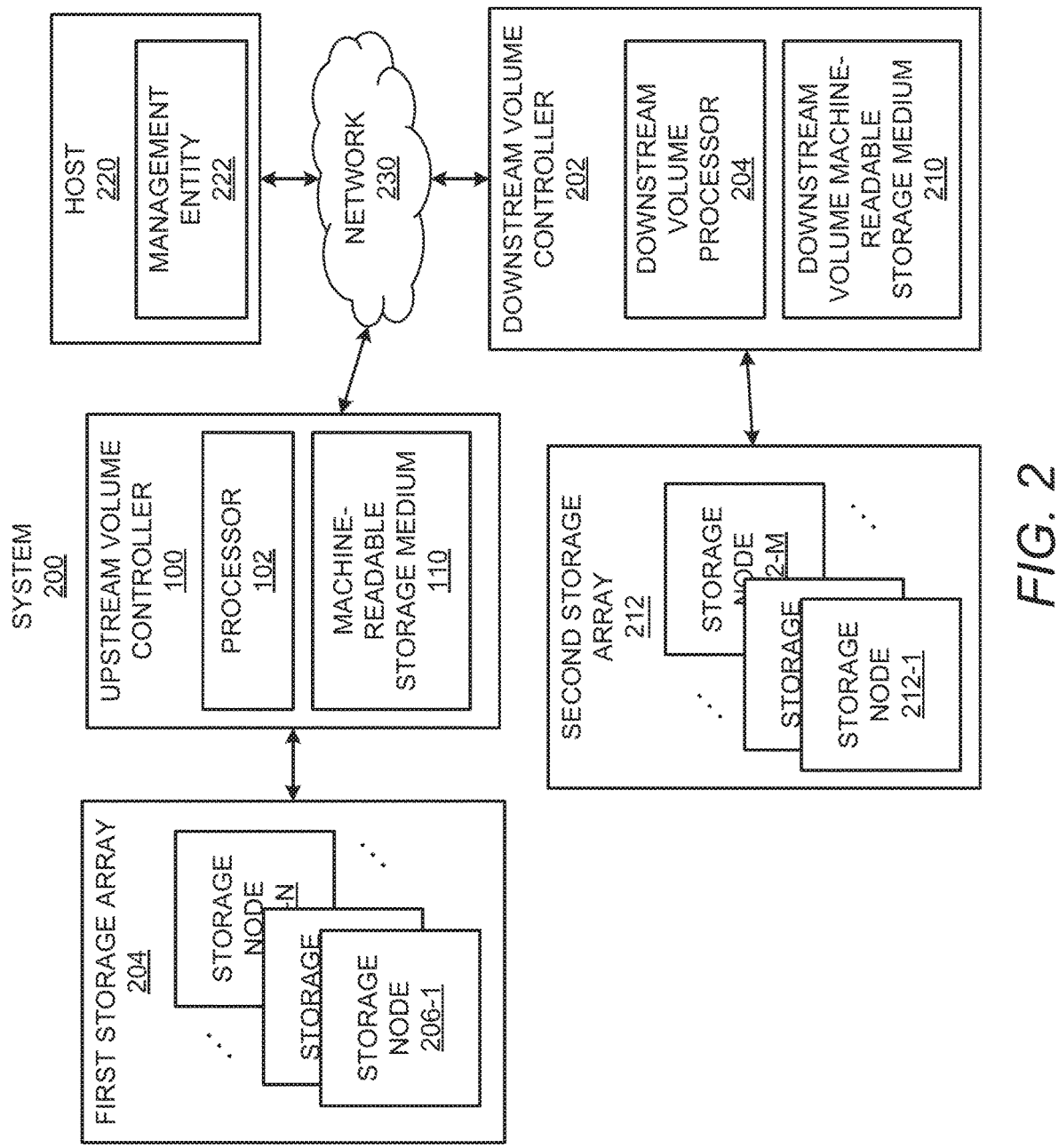
FIG. 2 depicts a block diagram of an example system that may include the upstream volume controller depicted in FIG. 1 and the downstream volume controller depicted in FIG. 3.
Figure 3:
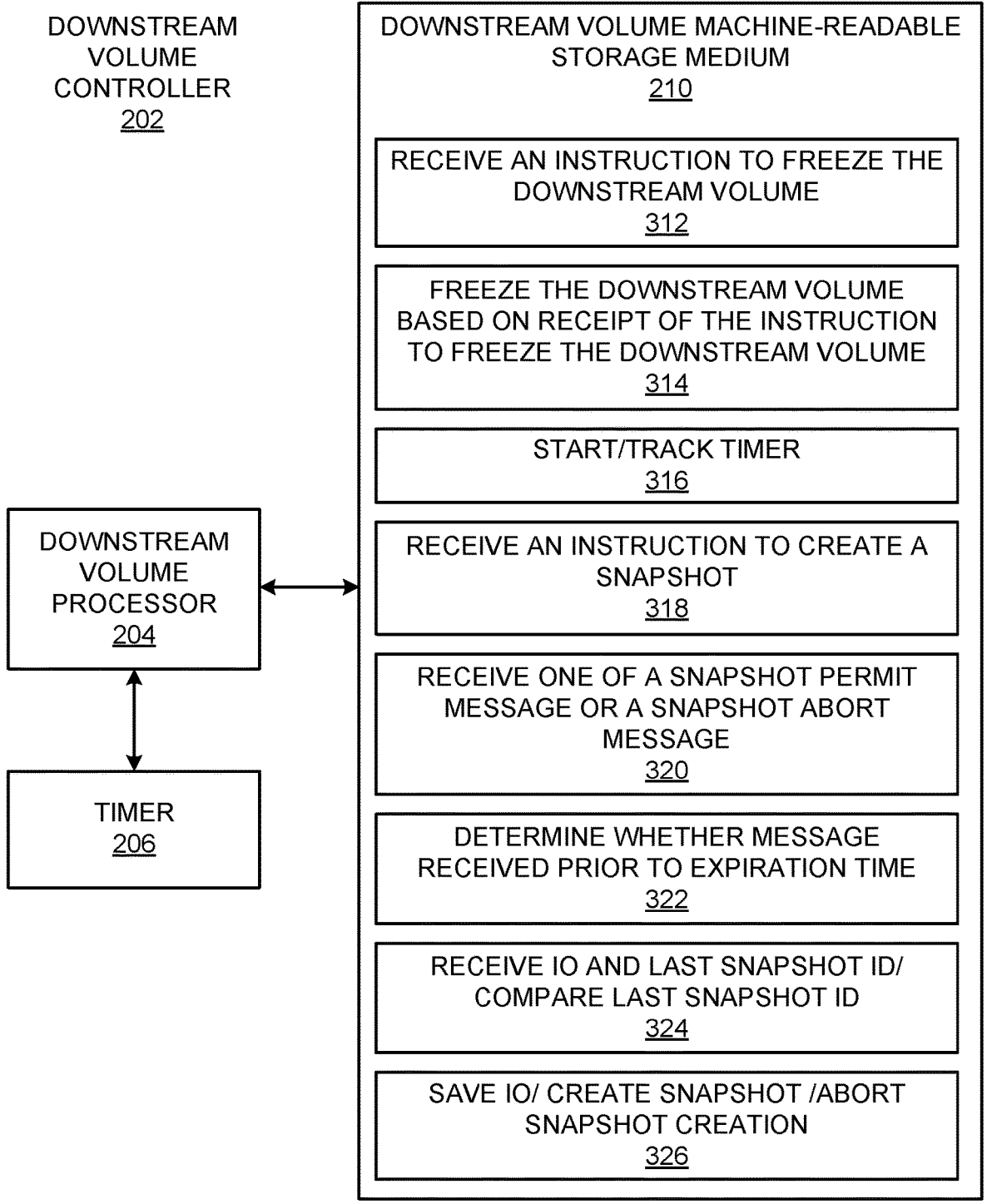
FIG. 3 depicts a block diagram of an example downstream volume controller that may manage a downstream volume.

Reference is first made to FIGS. 1-3. FIG. 1 shows a block diagram of an example upstream volume controller 100 that may manage an upstream volume. FIG. 2 depicts a block diagram of an example system 200 that may include the upstream volume controller 100 depicted in FIG. 1 and a downstream volume controller 202 depicted in FIG. 3. FIG. 3 depicts a block diagram of an example downstream volume controller 202 that may manage a downstream volume. It should be understood that the example upstream volume controller 100 depicted in FIG. 1, the system 200 depicted in FIG. 2, and the downstream volume controller 202 may include additional features and that some of the features described herein may be removed and/or modified without departing from any of the scopes of the upstream volume controller 100, the system 200, or the downstream volume controller 202.

The upstream volume controller 100 and the downstream volume controller 202 may each be a computing device, a server, a storage system controller, a storage node controller, or the like. The upstream volume controller 100 and the downstream volume controller 202 may be in respective storage arrays. As shown in FIGS. 1 and 2, the upstream volume controller 100 may include a processor 102 (which is also referenced herein as an upstream volume processor 102) that may control operations of the upstream volume controller 100. In addition, as shown in FIGS. 2 and 3, the downstream volume controller 202 may include a downstream volume processor 204 that may control operations of the downstream volume controller 202. The processors 102, 204 may each be a semiconductor-based microprocessor, a central processing unit (CPU), an application specific integrated circuit (ASIC), a field-programmable gate array (FPGA), and/or other suitable hardware device. Although the upstream volume controller 100 and the downstream volume controller 202 have each been depicted as including a single processor 102, 204, it should be understood that the upstream volume controller 100 and/or the downstream volume controller may include multiple processors, multiple cores, or the like, without departing from the scopes of the upstream volume controller 100 and the downstream volume controller 202 disclosed herein.

The upstream volume controller 100 may include a machine-readable storage medium 110 that may have stored thereon machine-readable instructions 112-120 (which may also be termed computer readable instructions) that the processor 102 may execute. The downstream volume controller 202 may include a downstream volume machine-readable storage medium 210 that may have stored thereon machine-readable instructions 312-326 (which may also be termed computer readable instructions) that the downstream volume processor 204 may execute. Each of the machine-readable storage mediums 110 and 210 may be an electronic, magnetic, optical, or other physical storage device that contains or stores executable instructions. Each of the machine-readable storage mediums 110, 210 may be, for example, Random Access memory (RAM), an Electrically Erasable Programmable Read-Only Memory (EEPROM), a storage device, an optical disc, and the like. The machine-readable storage mediums 110, 210 may each be a non-transitory machine-readable storage medium, where the term "non-transitory" does not encompass transitory propagating signals.

As shown in FIG. 2, the system 200 may include the upstream volume controller 100 and the downstream volume controller 202. The system 200 may also include a first storage array 204 and a second storage array 212. The first storage array 204 may include a plurality of storage nodes 206-1 to 206-N, where the variable "N" is a value greater than one. The storage nodes 206-1 to 206-N may be storage devices, e.g., hard drives, flash drives, or the like, in the storage array 204. The second storage array 212 may include a plurality of storage nodes 212-1 to 212-M, where the variable "M" is a value greater than one. The upstream volume controller 202 and the storage nodes 206-1 to 206-N may communicatively be coupled to one another via a network, such as a local area network, a fiber channel network, the Internet, or the like. Similarly, the downstream volume controller 202 and the storage nodes 212-1 to 212-M may be communicatively coupled to one another via a network, such as a local area network, a fiber channel network, the Internet, or the like.

In some examples, the network connecting the upstream volume controller 100 to the first storage array 204 and the downstream volume controller 202 to the second storage array 212 may be the same network. In addition or alternatively, the storage nodes 206-1 to 206-N may be housed in a common electronics rack, across multiple electronics racks, in a common data center, across multiple data centers, or the like. The storage nodes 212-1 to 212-M may similarly be situated with respect to each other.

According to examples, the upstream volume controller 100 may manage an upstream volume, which may be a logical set of blocks that may be spread across some or all of the storage nodes 206-1 to 206-N. Likewise, the downstream volume controller 202 may manage a downstream volume, which may be a logical set of blocks that may be spread across some or all of the storage nodes 212-1 to 212-M. According to examples, the downstream volume may be a replica of the upstream volume. In other words, the downstream volume may be a backup volume (e.g., copy) of the upstream volume and may be updated each time the upstream volume is updated. As the downstream volume is a replica of the upstream volume, the upstream volume may be construed as being in a replication set with the downstream volume. In other words, the upstream volume and the downstream volume may be in a consistency group that may be replicated together as a group to guarantee synchronization of the data in the upstream volume and the downstream volume. The upstream volume may equivalently be referenced herein as a source volume and the downstream volume may equivalently be referenced herein as a destination volume.

The upstream volume and the downstream volume may be stored across multiple storage nodes 206-1 to 206-N and 212-1 to 212-M such that even if one or more of the storage nodes 206-1 to 206-N and 212-1 to 212-M were to fail, data loss may be prevented or mitigated. To allow for the redundant storage of data, the storage nodes 206-1 to 206-N and 212-1 to 212-M may operate independently of one another. That is, the failure of one or more of the storage nodes 212-1 may not cause the failure of the remainder of the storage nodes 212-1 to 212-M. The storage nodes 206-1 to 206-N and 212-1 to 212-M may be geographically distributed (e.g., distributed at geographically disparate locations). While the upstream volume controller 100 and the downstream volume controller 202 are depicted as components that are separate from each of the storage nodes 206-1 to 206-N and 212-1 to 212-M, respectively, the upstream volume controller 100 may be instantiated within one or more of the storage nodes 206-1 to 206-N and/or the downstream volume controller 202 may be instantiated within one or more of the storage nodes 212-1 to 212-M.

According to examples, the upstream volume controller 100 and the downstream volume controller 202 may receive instructions from and may send data to a host 220 via a network 230. The host 220 may be a computing device through which input/output (IO) instructions, snapshot creation instructions, or the like, may be communicated to the upstream volume controller 100. In one regard, the host 220 may include a management entity 222, e.g., a group/cluster level management daemon, that may, for instance, send snapshot and freeze requests to the upstream volume controller 100 and the downstream volume controller 202 as discussed in greater detail herein. The upstream volume controller 100 may also communicate responses and acknowledgement messages to the host 220. In any regard, the network 230 may be a local area network, a fiber channel network, the Internet, or the like. In other examples, the management entity 222 may instead be executed in the upstream volume, the downstream volume, or in another volume.

The upstream volume controller 100 may also communicate with the downstream volume controller 202 via the network 230 or through a separate network. By way of example in which the network 230 is the Internet, the upstream volume controller 100 may communicate with the downstream volume controller 202 via a local area network. For instance, the upstream volume controller 100 may send snapshot permit and snapshot abort messages to the downstream volume controller 202 via the network 230 or another network as discussed herein.

The processor 102 may fetch, decode, and execute the instructions 112 to freeze an upstream volume. That is, for instance, the processor 102 may receive an instruction from the management entity 222 to freeze the upstream volume. While frozen, the processor 102 may not commit any IOs on the data contained in the upstream volume. Thus, for instance, the processor 102 may not add data, modify data, erase data, and/or move data in the upstream volume while the upstream volume is frozen. The processor 102 may also not send any IOs to the downstream volume while the upstream volume is frozen. The management entity 222 may also communicate an instruction to the downstream volume processor 204 to freeze the downstream volume, which may cause the downstream volume processor 204 to be unable to commit any IO operations on the data contained in the downstream volume. As noted herein, the downstream volume may be in a replication set with the upstream volume, e.g., the downstream volume may be a replica of the upstream volume and may thus include the same data as the upstream volume.

The processor 102 may fetch, decode, and execute the instructions 114 to receive a snapshot creation request. For instance, the processor 102 may receive the snapshot creation request from the management entity 222. In addition, the processor 102 may fetch, decode, and execute the instructions 116 to create a snapshot of the upstream volume. Thus, for instance, the processor 102 may create a snapshot of the upstream volume while the upstream volume is frozen. The snapshot may be a copy or replica of the data in the upstream volume at a point in time, i.e., at the moment the snapshot is created. In addition, the processor 102 may store the snapshot in one or more of the storage nodes 206-1 to 206-N in the first storage array 204.

The processor 102 may fetch, decode, and execute the instructions 118 to send one of a snapshot permit message or a snapshot abort message to the downstream volume processor 204. As discussed herein, the processor 102 may send the snapshot permit message or the snapshot abort message based on a determination as to whether or not the downstream volume is in-sync with the upstream volume.

According to examples, the processor 102 may fetch, decode, and execute the instructions 120 to unfreeze the upstream volume responsive to at least one of the sending of the one of the snapshot permit message or the snapshot abort message to the downstream volume processor 204 or expiration of a timeout corresponding to a maximum time period during which the upstream volume is to remain frozen. That is, the processor 102 may unfreeze the upstream volume such that an IO may be committed to the upstream volume immediately following the sending of one of the permit or abort messages to the downstream volume processor 204, e.g., prior to expiration of a timeout period. In this regard, the upstream volume may remain frozen for a minimized period of time, which may minimize IO latency of the upstream volume. However, the processor 102 may unfreeze the upstream volume when the timeout expires if the processor 102 does not unfreeze the upstream volume prior to expiration of the timeout.

Figure 4:
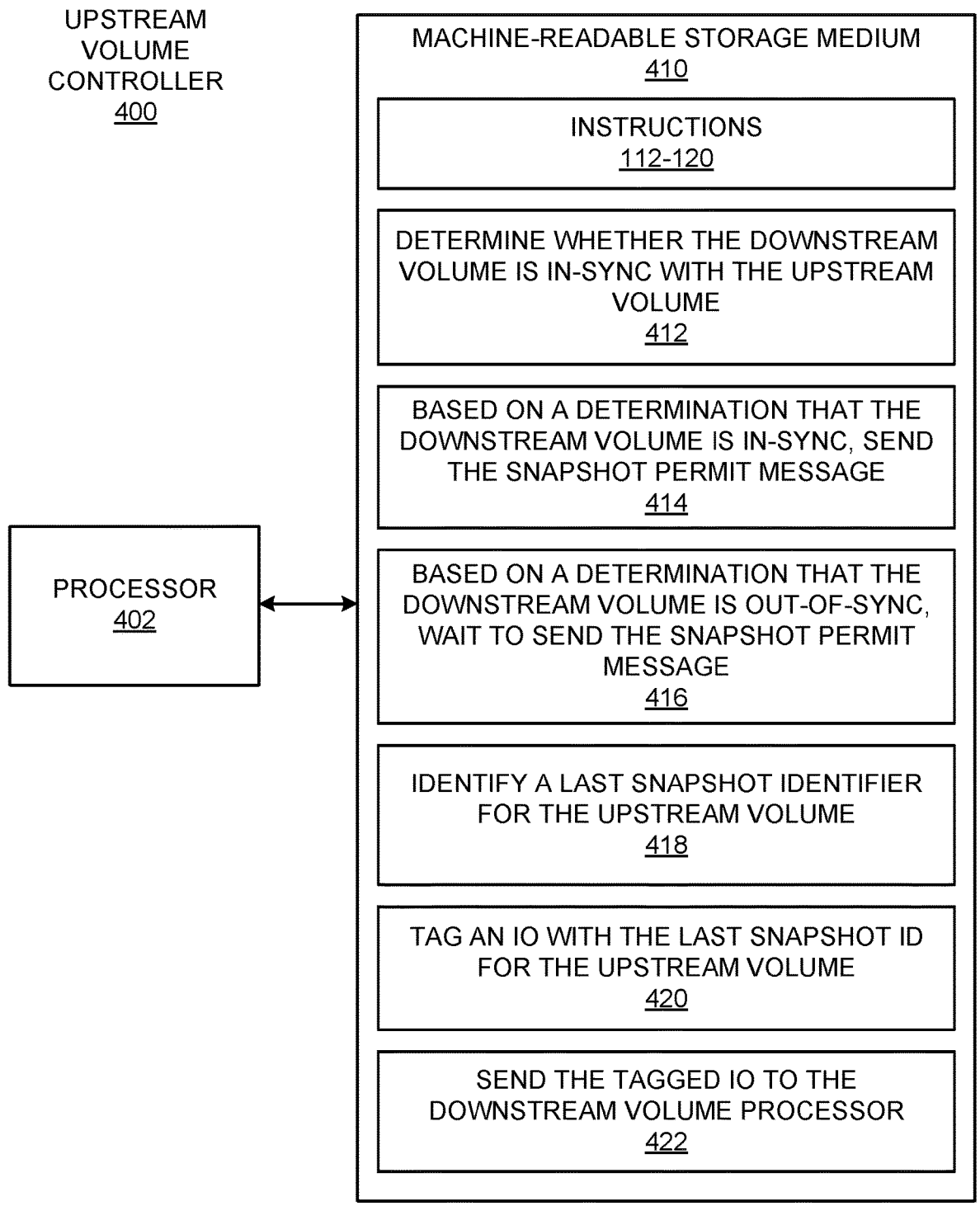
FIG. 4 depicts a block diagram of another example upstream volume controller that may manage an upstream volume.

Turning now to FIG. 4, there is shown a block diagram of another example upstream volume controller 400 that may manage an upstream volume. It should be understood that the example upstream volume controller 400 depicted in FIG. 4 may include additional features and that some of the features described herein may be removed and/or modified without departing from the scope of the upstream volume controller 400. The description of the upstream volume controller 400 is also made with reference to FIGS. 1-3.

The upstream volume controller 400 may include a processor 402 and a machine-readable storage medium 410. The processor 402 may be equivalent to the processor 102 and the machine-readable storage medium 410 may be equivalent to the machine-readable storage medium 110 depicted in FIGS. 1 and 2. As such, for instance, the machine-readable storage medium 410 may include the instructions 112-120 discussed above with respect to the machine-readable storage medium 110. In addition, the machine-readable storage medium 410 may have stored thereon machine-readable instructions 412-422 that the processor 402 may execute. According to examples, the processor 402 may execute the instructions 412-422 prior to and/or as part of the execution of the instructions 118 to determine whether the processor 402 is to send the snapshot permit message or the snapshot abort message.

The processor 402 may fetch, decode, and execute the instructions 412 to determine whether the downstream volume is in-sync with the upstream volume. That is, the processor 402 may determine that the downstream volume is in-sync with the upstream volume based on a determination that the downstream volume is synchronized with the upstream volume, that the downstream volume is a replica of the upstream volume, that the downstream volume is in the same state as the upstream volume, or the like. The processor 402 may determine whether the downstream volume is in-sync with the upstream volume based on a state of the acknowledgement messages pertaining to IOs committed to the downstream volume received from the downstream volume processor 204. For instance, the processor 402 may determine that the downstream volume is out-of-sync based on the processor 402 determining that an acknowledgement message corresponding to a last IO has not been received from the downstream volume processor 204.

Based on a determination that the downstream volume is in-sync with the upstream volume, the processer 402 may fetch, decode, and execute the instructions 414 to send a snapshot permit message to the downstream volume processor 204. In response to receipt of the snapshot permit message, the downstream volume processor 204 may fetch, decode, and execute the instructions 326 (FIG. 3) to create a snapshot of the downstream volume. The snapshot of the downstream volume may be a copy or replica of the data in the downstream volume at a point in time, i.e., at the moment the snapshot is created. In addition, the downstream volume processor 204 may store the snapshot in one or more of the storage nodes 212-1 to 212-N in the second storage array 212.

However, based on a determination that the downstream volume is not in-sync, e.g., is out-of-sync, with the upstream volume, the processor 402 may fetch, decode, and execute the instructions 416 to delay the sending of the snapshot permit message until the processor 402 determines that the downstream volume is in-sync with the upstream volume. That is, the processor 402 may determine that the downstream volume is out-of-sync with the upstream volume based on a lack of acknowledgement from the downstream volume processor 204 to an IO. In addition, following receipt of the acknowledgement from the downstream volume processor 204 to the IO, the processor 402 may send the snapshot permit message to the downstream volume processor 204. These instances may occur, for example, when an IO has been committed to the upstream volume but the IO has not yet been committed to the downstream volume. In these examples, the downstream volume processor 204 may send an acknowledgement message to the processor 402 once the IO has been committed to the downstream volume.

In other examples, the processor 402 may, based on a determination that the downstream volume is out-of-sync with the upstream volume, send a snapshot abort message to the downstream volume processor 204. In addition, the processor 402 may re-send an IO or multiple IOs for the downstream volume processor 204 to commit to the downstream volume to cause the downstream volume to become in-sync with the upstream volume. Following a determination that the downstream volume is in-sync with the upstream volume, the processor 402 may send the snapshot permit message to the downstream volume processor 204. In addition, the downstream volume processor 204 may fetch, decode, and execute the instructions 326 to, based on receipt of the snapshot abort message, abort creation of the snapshot of the downstream volume.

According to examples, the processor 402 may fetch, decode, and execute the instructions 418 to identify a last snapshot identifier (ID) for a most recently created snapshot, in which the last snapshot ID may be incremented for each successively created snapshot. According to examples, the management entity 222 may assign the snapshot IDs to the snapshots. In addition, the processor 402 may fetch, decode, and execute the instructions 420 to tag an IO with the last snapshot ID. The processor 402 may also fetch, decode, and execute the instructions 422 to send the tagged IO to the downstream volume processor 204. The management entity 222 may determine the last snapshot ID and may forward the last snapshot ID to the upstream processor 102 and the downstream volume processor 204 to control the snapshot creation and the tagging of the IOs.

According to examples, prior to creating a snapshot of the downstream volume, the downstream volume processor 204 may fetch, decode, and execute the instructions 312 to receive an instruction to freeze the downstream volume. For instance, the downstream volume processor 204 may receive the instruction to freeze the downstream volume from the management entity 222. The downstream volume processor 204 may freeze the downstream volume based on receipt of the instruction to freeze the downstream volume prior to receipt of the snapshot permit message or the snapshot abort message from the upstream volume processor 402.

The downstream volume processor 204 may fetch, decode, and execute the instructions 314 to freeze the downstream volume. In addition, the downstream volume processor 204 may fetch, decode, and execute the instructions 316 to start/track a timer 206 having an expiration time. By way of example, the expiration time may be between about 2 seconds and 5 seconds and may correspond to a timeout at which the downstream volume processor 204 unfreezes the downstream volume. That is, the downstream volume processor 204 may initiate the timer 206 when the downstream volume is frozen and may unfreeze the downstream volume when the timer 206 reaches the expiration time.

The downstream volume processor 204 may fetch, decode, and execute the instructions 318 to create a snapshot of the downstream volume from the management entity 222. That is, the management entity 222 may send the instruction to create a snapshot of the downstream volume while the downstream volume is frozen. However, if there is a delay or other issue pertaining to the snapshot creation instruction, the downstream volume processor 204 may not receive the snapshot creation instruction until after the expiration time has elapsed. In this instance, the downstream volume processor 204 may fetch, decode, and execute the instructions 326 to unfreeze the downstream volume when the expiration time has elapsed and may abort creation of the snapshot.

The downstream volume processor 204 may fetch, decode, and execute the instructions 320 to receive one of a snapshot permit message or a snapshot abort message from the upstream volume processor 102, 402. The downstream volume processor 204 may fetch, decode, and execute the instructions 322 to determine whether the snapshot permit message or the snapshot abort message was received prior the expiration time elapsing. Based on a determination that the snapshot permit message or the snapshot abort message was received after the expiration time elapsing, the downstream volume processor 204 may fetch, decode, and execute the instructions 326 to unfreeze the downstream volume when the expiration time has elapsed and may abort creation of the snapshot. In addition, based on a determination that the snapshot abort message was received prior to the expiration time elapsing, the downstream volume processor 204 may fetch, decode, and execute the instructions 326 to abort creation of the snapshot and may unfreeze the downstream volume. However, based on a determination that the snapshot permit message was received prior to the expiration time elapsing, the downstream volume processor 204 may fetch, decode, and execute the instructions 326 to create the snapshot and may unfreeze the downstream volume following creation of the snapshot.

As noted in the discussion above, the downstream volume processor 204 may not create the snapshot of the downstream volume upon receipt of the snapshot creation instruction, even when the instruction is received prior to the expiration time elapsing. Instead, the downstream volume processor 204 may create the snapshot following receipt of a snapshot permit message from the upstream volume processor 102, 402 prior to the expiration time elapsing.

In addition, following receipt of the instruction to freeze the downstream volume, the downstream volume processor 204 may fetch, decode, and execute the instructions 324 to receive an IO and a last snapshot identifier for the upstream volume from the upstream volume processor 402. The downstream volume processor 204 may also execute the instructions 324 to determine whether the received last snapshot ID for the upstream volume is less than or equal to a downstream volume last snapshot ID. The downstream volume last snapshot ID may be an identifier of a last snapshot created of the downstream volume, which may be incremented each time a snapshot of the downstream volume is created.

Based on a determination that the last snapshot ID for the upstream volume received from the upstream volume processor 402 is greater than the downstream volume last snapshot, the downstream volume processor 204 may execute the instructions 326 to save the received IO in a queue and to accept the received IO following creation of the snapshot of the downstream volume or following unfreezing of the downstream volume due to expiration of the expiration time. In this regard, the downstream volume processor 204 may preserve the ordering in which IOs are received from the upstream volume processor 402 in instances in which, for example, the upstream volume processor 402 sent a snapshot permit message and unfroze the upstream volume and a new IO is received, which is sent for replication to the downstream volume while the downstream volume is frozen.

Instead of the machine-readable storage mediums 110, 210, 410 the upstream volume controller 100, 400 and/or the downstream volume controller 202 may include hardware logic blocks that may perform functions similar to the respective instructions 112-120, 312-326, and 412-422. In other examples, the upstream volume controller 100, 400 and/or the downstream volume controller 202 may include a combination of instructions and hardware logic blocks to implement or execute functions corresponding to the respective instructions 112-120, 312-326, and 412-422. In any of these examples, the processor 102 may implement the hardware logic blocks and/or execute the instructions 112-120, 412-422 and/or the downstream volume processor 204 may implement the hardware logic blocks and/or execute the instructions 312-326. As discussed herein, the upstream volume controller 100, 400 and/or the downstream volume controller 202 may also include additional instructions and/or hardware logic blocks such that the processor 102, 402 and/or the downstream volume processor 204 may execute operations in addition to or in place of those discussed above with respect to FIGS. 1-4.

Figure 5:
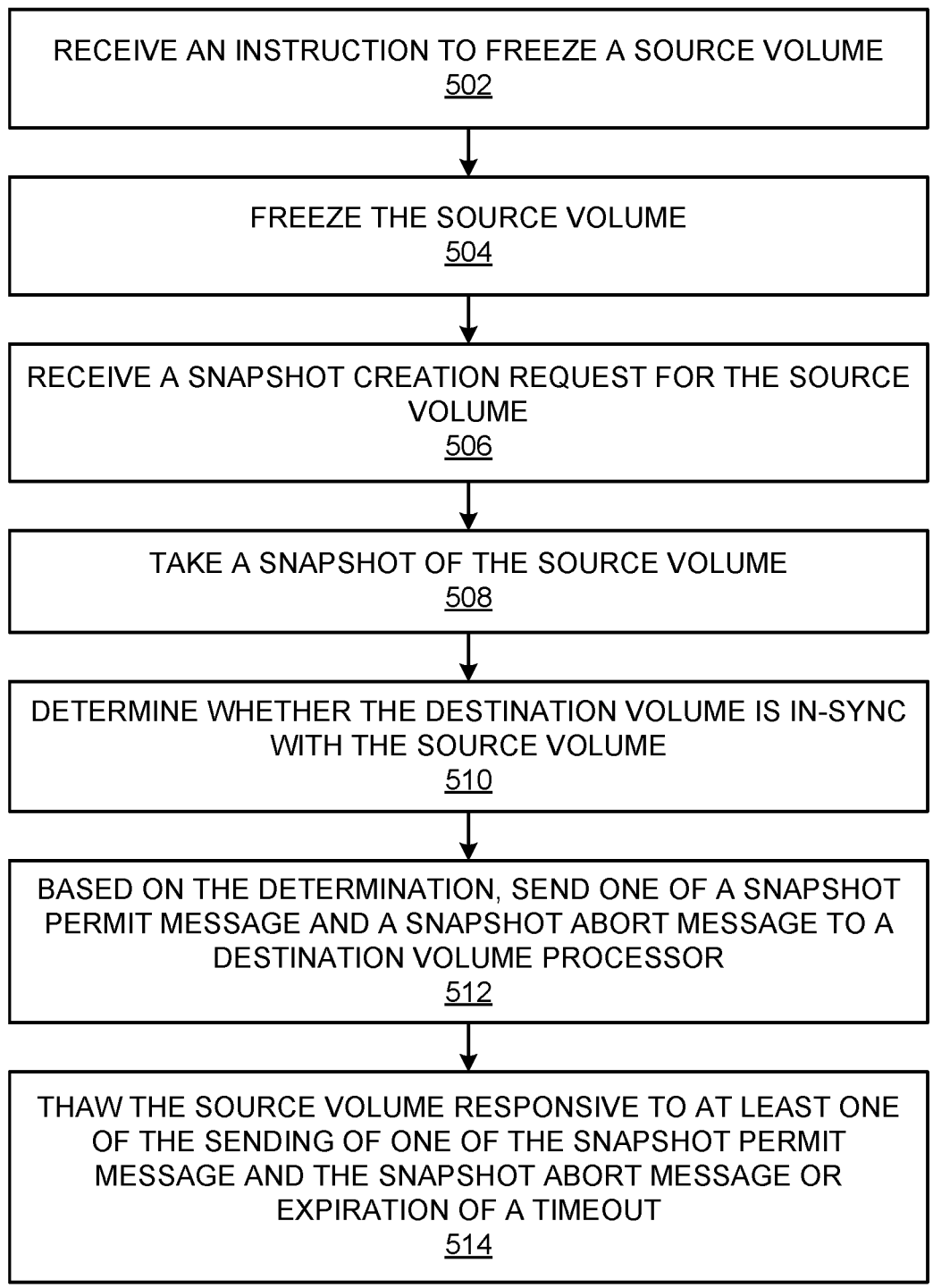
FIG. 5 depicts a flow diagram of an example method for managing a source volume.
Figure 6:
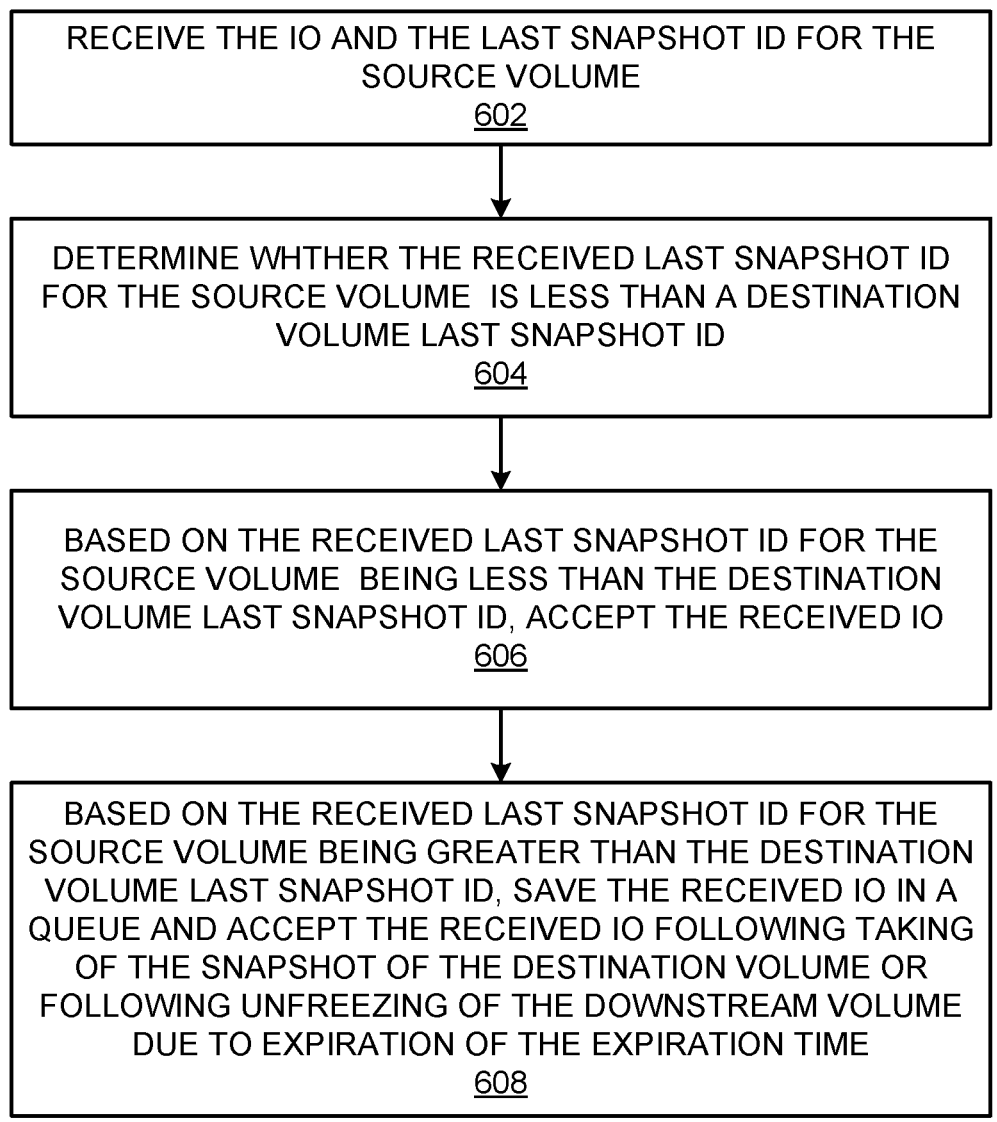
FIG. 6 depicts a flow diagram of an example method for managing a destination volume.

Various manners in which the upstream volume controller 100, 400 and the downstream volume controller 202 may operate are discussed in greater detail with respect to the methods 500 and 600 respectively depicted in FIGS. 5 and 6. Particularly, FIG. 5 depicts a flow diagram of an example method 500 for managing a source volume and FIG. 6 depicts a flow diagram of an example method 600 for managing a destination volume. It should be understood that the methods 500 and 600 may include additional operations and that some of the operations described therein may be removed and/or modified without departing from the scopes of the methods 500 and 600. The descriptions of the methods 500 and 600 are made with reference to the features depicted in FIGS. 1-4 for purposes of illustration.

With reference first to FIG. 5, at block 502, the processor 102, 402 may receive an instruction to freeze a source volume. The source volume may be equivalent to the upstream volume discussed herein and the processor 102, 402 may receive the instruction from a host 220. In addition, at block 504, the processor 102, 402 may freeze the source volume. That is, the processor 102, 402 may block or prevent IOs from executing on the source volume.

At block 506, the processor 102, 402 may receive a snapshot creation request for the source volume. The processor 102, 402 may receive the snapshot creation request from the host 220. In addition, at block 508, the processor 102, 402 may take a snapshot of the source volume in similar manners to those discussed above. Although recited as separate operations, the processor 102, 402 may receive the instruction to freeze the source volume and to create the snapshot as part of a combined instruction.

At block 510, the processor 102, 402 may determine whether the destination volume is in-sync with the source volume. Based on the determination as to whether the destination volume is in-sync with the source volume, at block 512, the processor 102, 402 may send one of a snapshot permit message and a snapshot abort message to a destination volume processor 204. In addition, at block 514, the processor 102, 402 may thaw the source volume responsive to at least one of the sending of the one of the snapshot permit message or the snapshot abort message or expiration of a timeout corresponding to a maximum time period during which the source volume is to remain frozen. In other words, the processor 102, 402 may unfreeze the source volume immediately after sending the snapshot permit message or the snapshot abort message to the destination volume processor 204 or upon expiration of the timeout.

As discussed herein, based on a determination that the destination volume is in-sync with the source volume, the processor 102, 402 may send the snapshot permit message to the destination volume processor 204. However, based on a determination that the destination volume is out-of-sync with the source volume, the processor 102, 402 may send the snapshot abort message to the destination volume processor 204. Based on receipt of the snapshot abort message, the destination volume processor 204 may skip or abort creation of the snapshot of the destination volume. In other examples, based on a determination that the destination volume is out-of-sync with the source volume, the processor 102, 402 may wait to send the snapshot permit message to the destination volume processor 204 until the destination volume is determined to be in in-sync with the source volume.

According to examples, the processor 102, 402 may send an IO and a last snapshot ID for the source volume to the destination volume processor 204 following thawing of the source volume, the last snapshot ID for the source volume corresponding to a most recent snapshot of the source volume that does not include the IO. In addition, as shown in FIG. 6 at block 602, the destination volume processor 204 may receive the IO and the last snapshot ID for the source volume from the processor 102, 402. At block 604, the destination volume processor 204 may determine whether the received last snapshot ID for the source volume is less than or equal to a destination volume last snapshot ID. Based on the received last snapshot ID for the source volume being less than or equal to the destination volume last snapshot ID, at block 606, the destination volume processor 204 may accept (e.g., commit) the received IO and may take a snapshot of the destination volume following acceptance of the received IO. However, based on the last snapshot ID for the source volume being greater than the destination volume last snapshot ID, at block 608, the destination volume processor 204 may save the received IO in a queue and may accept (e.g., commit) the received IO following the taking of the snapshot of the destination volume or following unfreezing of the destination volume due to expiration of the expiration time.

Some or all of the operations set forth in the methods 500 and 600 may be contained as utilities, programs, or subprograms, in any desired computer accessible medium. In addition, the methods 500 and 600 may be embodied by computer programs, which may exist in a variety of forms. For example, some operations of the methods 500 and 600 may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 7:
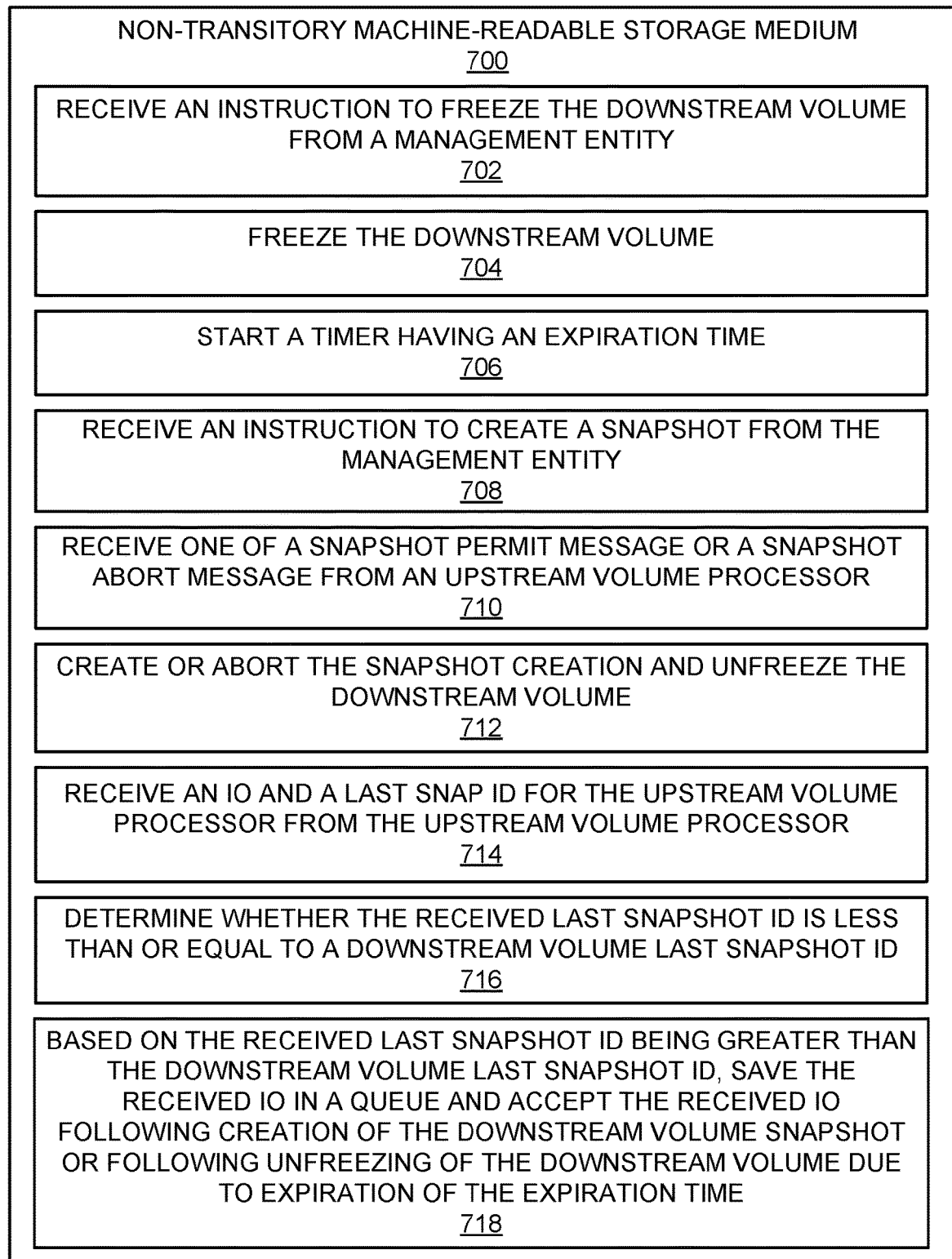
FIG. 7 depicts a block diagram of an example non-transitory machine-readable storage medium for managing a downstream volume processor in implementing snapshot creation operations.

With reference now to FIG. 7, there is shown a block diagram of an example non-transitory machine-readable storage medium 700 for managing a downstream volume processor in implementing snapshot creation operations. The machine-readable storage medium 700 may be an electronic, magnetic, optical, or other physical storage device that contains or stores executable instructions. The machine-readable storage medium 700 may be, for example, Random Access memory (RAM), an Electrically Erasable Programmable Read-Only Memory (EEPROM), a storage device, an optical disc, and the like.

The non-transitory machine-readable storage medium 700 may have stored thereon machine-readable instructions 702-718 that a processor, e.g., the downstream volume processor 204, may execute. The machine-readable instructions 702 may cause the processor to receive an instruction to freeze a downstream volume, e.g., from the management entity 222. The machine-readable instructions 704 may cause the processor to freeze the downstream volume based on receipt of the instruction to freeze the downstream volume. The machine-readable instructions 706 may cause the processor to start a timer having an expiration time. The machine-readable instructions 708 may cause the processor to receive an instruction to create a snapshot of the downstream volume, e.g., from the management entity 222. The machine-readable instructions 710 may cause the processor to receive one of a snapshot permit message or a snapshot abort message from an upstream volume processor 102, 402. The machine-readable instructions 712 may cause the processor to create a snapshot or abort creation of the snapshot and to unfreeze the downstream volume. As discussed herein, the processor may unfreeze the downstream volume following expiration of the expiration time regardless of whether the snapshot is created or aborted.

The machine-readable instructions 714 may cause the processor to, following receipt of the instruction to freeze the downstream volume, receive an input/output (IO) and a last snapshot identifier (ID) for the upstream volume from the upstream volume processor 102, 402. In addition, the machine-readable instructions 716 may cause the processor to determine whether the received last snapshot ID for the upstream volume is less than or equal to a downstream volume last snapshot ID. Based on the last snapshot ID for the upstream volume being greater than the downstream volume last snapshot ID, the machine-readable instructions 718 may cause the processor to save the received IO in a queue and to accept the received IO following creation of the snapshot of the downstream volume or following unfreezing of the downstream volume due to expiration of the expiration time.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A system comprising:
    an upstream volume controller having:
        a processor; and
        a non-transitory machine-readable storage medium comprising instructions executable by the processor to:
            freeze an upstream volume, the upstream volume being in a replication set with a downstream volume;
            receive a snapshot creation request;
            create a snapshot of the upstream volume;
            send one of a snapshot permit message or a snapshot abort message to a downstream volume processor; and
            unfreeze the upstream volume responsive to at least one of:
                the sending of the one of the snapshot permit message or the snapshot abort message; or
                expiration of a timeout corresponding to a maximum time period during which the upstream volume is to remain frozen.

2. The system of claim 1, wherein the instructions are further executable by the processor to:
    determine whether the downstream volume is in-sync with the upstream volume;
    based on a determination that the downstream volume is in-sync with the upstream volume, send the snapshot permit message to the downstream volume processor; and
    based on a determination that the downstream volume is out-of-sync with the upstream volume, send the snapshot abort message.

3. The system of claim 1, wherein, to freeze the upstream volume, the instructions are further executable by the processor to:
    receive an instruction to freeze the upstream volume; and
    freeze the upstream volume based on receipt of the instruction to freeze the upstream volume.

4. The system of claim 3; wherein the instructions are further executable by the processor to receive the snapshot creation instruction and the instruction to freeze the upstream volume from a group management daemon.

5. The system of claim 1; wherein the instructions are further executable by the processor to:
    identify a last snapshot identifier (ID) for a most recently created snapshot, wherein the last snapshot ID is incremented for each successively created snapshot;
    tag an input/output (IO) with the last snapshot ID for the upstream volume; and
    send the tagged IO to the downstream volume processor.

6. The system of claim 1, further comprising:
    a downstream volume controller, the downstream volume controller having:
        the downstream volume processor; and
        a downstream volume non-transitory machine-readable storage medium comprising instructions executable by the downstream volume processor to:
            based on receipt of the snapshot permit message, create a snapshot of the downstream volume; and
            based on receipt of the snapshot abort message, abort creation of the snapshot of the downstream volume.

7. The system of claim 6, wherein the downstream volume instructions are further executable by the downstream volume processor to:
receive an instruction to freeze the downstream volume from a management entity; and
freeze the downstream volume based on receipt of the instruction to freeze the downstream volume prior to creation of the snapshot of the downstream volume.

8. The system of claim 7, wherein the downstream volume instructions are further executable by the downstream volume processor to:
start a timer having an expiration time from a time at which the downstream volume is frozen;
determine whether receipt of the instruction to create the snapshot, the receipt of the snapshot permit message, or the receipt of the snapshot abort message occurred following the timer reaching the expiration time; and
based on any of the receipt of the instruction to create the snapshot, the receipt of the snapshot permit message, or the receipt of the snapshot abort message occurring following the timer reaching the expiration time, abort creation of the snapshot.

9. The system of claim 7, wherein the downstream volume instructions are further executable by the downstream volume processor to:
following receipt of the instruction to freeze the downstream volume,
receive an input/output (IO) and a last snapshot identifier (ID) from the upstream volume processor;
determine whether the received last snapshot ID is less than or equal to a downstream volume last snapshot ID; and
based on the received last snapshot ID for the upstream volume being less than or equal to the downstream volume last snapshot ID, accept the received IO.

10. The system of claim 9, wherein the downstream volume instructions are further executable by the downstream volume processor to:
based on the received last snapshot ID being greater than the downstream volume last snapshot ID,
save the received IO in a queue; and
accept the received IO following creation of the snapshot of the downstream volume or following unfreezing of the downstream volume due to expiration of the expiration time.

11. The system of claim 1, wherein the downstream volume is a backup volume to the upstream volume.

12. A computer-implemented method comprising:
receiving, by a processor, an instruction to freeze a source volume, the source volume being part of a replication set with a destination volume;
freezing, by the processor, the source volume;
receiving, by the processor, a snapshot creation request for the source volume;
taking, by the processor, a snapshot of the source volume;
determining, by the processor, whether the destination volume is in-sync with the source volume;
based on the determination as to whether the destination volume is in-sync with the source volume, sending, by the processor, one of a snapshot permit message and a snapshot abort message to a destination volume processor; and
thawing, by the processor, the source volume responsive to at least one of:
the sending the one of the snapshot permit message or the snapshot abort message; or
expiration of a timeout corresponding to a maximum time period during which the source volume is to remain frozen.

13. The method of claim 12, further comprising:
based on a determination that the destination volume is in-sync with the source volume, sending the snapshot permit message to the destination volume processor; and
based on a determination that the destination volume is out-of-sync with the source volume, sending the snapshot abort message to the destination volume processor.

14. The method of claim 12, further comprising:
sending an input/output (IO) and a last snapshot identifier (ID) for the source volume to the destination volume processor following thawing of the source volume, the last snapshot ID for the source volume corresponding to a most recent snapshot of the source volume that does not include the IO.

15. The method of claim 14, further comprising:
receiving, by the destination volume processor, the IO and the last snapshot ID for the source volume;
determining whether the received last snapshot ID for the source volume is less than or equal to a destination volume last snapshot ID;
based on the received last snapshot ID for the source volume being less than or equal to the destination volume last snapshot ID, accepting the received IO.

16. The method of claim 15, further comprising:
based on the last snapshot ID for the source volume being greater than the destination volume last snapshot ID, saving the received IO in a queue; and
accepting the received IO following taking of the snapshot of the destination volume.

17. The method of claim 12, further comprising:
receiving, by the destination volume processor, one of the snapshot permit message and the snapshot abort message;
based on receipt of the snapshot permit message, taking a snapshot of the destination volume; and
based on receipt of the snapshot abort message, abort taking of the snapshot of the destination volume.

18. A non-transitory machine-readable storage medium comprising instructions that when executed by a downstream volume processor are to cause the downstream volume processor to:
receive an instruction to freeze a downstream volume from a management entity;
freeze the downstream volume based on receipt of the instruction to freeze the downstream volume;
start a timer having an expiration time from a time at which the downstream volume is frozen;
receive an instruction to create a snapshot of the downstream volume from the management entity;
receive one of a snapshot permit message or a snapshot abort message from an upstream volume processor;
determine whether the instruction to create the snapshot, the snapshot permit message, or the snapshot abort message was received following the timer reaching the expiration time; and
based on any of the instruction to create the snapshot, the snapshot permit message, or the snapshot abort message being received following the timer reaching the expiration time, abort creation of the snapshot.

19. The non-transitory computer readable medium of claim 18, wherein the instructions are further to cause the processor to:

receive an input/output (IO) and a last snapshot identifier (ID) from the upstream volume processor; and determine whether the received last snapshot ID is less than or equal to a downstream volume last snapshot ID.

20. The non-transitory computer readable medium of claim 19, wherein the instructions are further to cause the processor to:

based on the received last snapshot ID being greater than the downstream volume last snapshot ID,
- save the received IO in a queue; and
- accept the received IO following creation of the snapshot of the downstream volume or following unfreezing of the downstream volume due to expiration of the expiration time.

* * * * *